US011858523B2

(12) United States Patent
Sakashita et al.

(10) Patent No.: US 11,858,523 B2
(45) Date of Patent: Jan. 2, 2024

(54) VEHICLE TRAVEL CONTROL DEVICE

(71) Applicant: Mazda Motor Corporation, Hiroshima (JP)

(72) Inventors: Shinsuke Sakashita, Hiroshima (JP); Daisuke Horigome, Hiroshima (JP); Masato Ishibashi, Hiroshima (JP); Eiichi Hojin, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 167 days.

(21) Appl. No.: 17/483,841

(22) Filed: Sep. 24, 2021

(65) Prior Publication Data

US 2022/0009509 A1    Jan. 13, 2022

Related U.S. Application Data

(63) Continuation of application No. PCT/JP2020/009784, filed on Mar. 6, 2020.

(30) Foreign Application Priority Data

Mar. 29, 2019 (JP) .................................. 2019-068276

(51) Int. Cl.
*B60W 50/02* (2012.01)
*B60W 10/04* (2006.01)
(Continued)

(52) U.S. Cl.
CPC ........ *B60W 50/0225* (2013.01); *B60W 10/04* (2013.01); *B60W 10/18* (2013.01);
(Continued)

(58) Field of Classification Search
CPC ............. B60T 2210/14; B60T 2210/30; B60T 2210/32; B60T 2210/36; B60T 7/22;
(Continued)

(56) References Cited

U.S. PATENT DOCUMENTS 9,533,539 B2 *   1/2017   Eng ...................... B60G 17/019
10,229,231 B2 *  3/2019   Nallapa .................... G09B 9/04
(Continued)

FOREIGN PATENT DOCUMENTS

EP    3159853 A1    4/2017
JP    H06-032186 A  2/1994
(Continued)

OTHER PUBLICATIONS

International Search Report and Written Opinion dated Jun. 9, 2020, received for PCT Application PCT/JP2020/009784, Filed on Mar. 6, 2020, 12 pages including English Translation.

*Primary Examiner* — Babar Sarwar
(74) *Attorney, Agent, or Firm* — XSENSUS LLP

(57) ABSTRACT

A vehicle travel control device includes computation circuitry, and a device controller that controls actuation of a traveling device mounted on a vehicle, based on a result from the computation circuitry. The computation circuitry identifies a vehicle outdoor environment based on an output from image circuitry that acquires image information of vehicle outdoor environment, sets a route on which the vehicle is to travel, in accordance with the vehicle outdoor environment previously identified, determines a target motion of the vehicle to follow the route previously set, calculates a target physical quantity to be executed by the traveling device to achieve the target motion previously determined, and calculates a controlled variable of the traveling device such that the target physical quantity calculated is achieved, and the device controller outputs a control signal to the traveling device so as to control the traveling device to control a motion of the vehicle.

19 Claims, 12 Drawing Sheets

(51) Int. Cl.
*B60W 10/18* (2012.01)
*B60W 10/20* (2006.01)
*G06N 3/08* (2023.01)

(52) U.S. Cl.
CPC ........ *B60W 10/20* (2013.01); *B60W 50/0205* (2013.01); *G06N 3/08* (2013.01); *B60W 2420/42* (2013.01); *B60W 2420/52* (2013.01); *B60W 2710/18* (2013.01); *B60W 2710/20* (2013.01)

(58) Field of Classification Search
CPC ... B60T 8/17555; B60W 10/04; B60W 10/18; B60W 10/20; B60W 2420/42; B60W 2420/52; B60W 2540/01; B60W 2540/221; B60W 2556/50; B60W 2710/18; B60W 2710/20; B60W 30/025; B60W 30/18172; B60W 40/02; B60W 50/0097; B60W 50/0205; B60W 50/0225; B60W 60/001; B62D 15/025; B62D 15/0265; G06N 3/08
See application file for complete search history.

(56) References Cited

U.S. PATENT DOCUMENTS

| | | | |
|---|---|---|---|
| 11,568,687 B2* | 1/2023 | Dingli | G07C 5/008 |
| 2017/0217276 A1* | 8/2017 | Banvait | B60G 17/0195 |
| 2018/0281816 A1 | 10/2018 | Otsuka et al. | |
| 2018/0335774 A1* | 11/2018 | Sato | G05D 1/0248 |
| 2019/0071083 A1* | 3/2019 | Takahashi | B60W 30/143 |
| 2019/0366914 A1* | 12/2019 | Ochida | B60Q 1/44 |
| 2020/0238980 A1 | 7/2020 | Goto et al. | |
| 2020/0310452 A1* | 10/2020 | Oyama | G05D 1/0223 |

FOREIGN PATENT DOCUMENTS

| | | |
|---|---|---|
| JP | 2016-222168 A | 12/2016 |
| JP | 2017-61278 A | 3/2017 |
| JP | 2017-092835 A | 5/2017 |
| JP | 2017-182347 A | 10/2017 |
| JP | 2017-190103 A | 10/2017 |
| JP | 2018-158684 A | 10/2018 |
| WO | 2018/134901 A1 | 7/2018 |
| WO | 2019/044645 A1 | 3/2019 |

\* cited by examiner

VEHICLE TRAVEL CONTROL DEVICE

CROSS-REFERENCE TO RELATED APPLICATIONS

The present application claims priority to international application PCT/JP2020/009784, filed Mar. 6, 2020, and Japanese application number 2019-068276 filed in the Japanese Patent Office on Mar. 29, 2019, the entire contents of both of which being incorporated herein by reference.

TECHNICAL FIELD

The techniques disclosed here relates to a technology concerning a vehicle travel control device.

BACKGROUND ART

A vehicle travel control device known to date controls a plurality of on-vehicle devices for travel mounted on a vehicle.

As an example of such a vehicle travel control device, Patent Document 1, for example, describes a control system that is hierarchized into device control parts for controlling a plurality of on-vehicle devices and domain control parts for managing the device control parts in a plurality of domains previously defined in accordance with functions of the on-vehicle devices. The control system also includes an integrated control part located at a higher rank than the domain control parts and manages the domain control parts.

In Patent Document 1, the device control parts calculate controlled variables of the corresponding on-vehicle devices, and output control signals for achieving the controlled variables to the on-vehicle devices.

CITATION LIST

Patent Document

Patent Document 1: Japanese Patent Application Publication No. 2017-61278

SUMMARY

Technical Problems

In recent years, development of automated driving systems has been promoted on a national scale. In general, in an automated driving system, vehicle outdoor environment information is acquired by a camera or other devices, and based on the acquired vehicle outdoor environment information, a route on which a vehicle is to travel is calculated. In the automated driving system, traveling devices (one or more active device that control a motion of a vehicle) are controlled in order to follow the route to be traveled.

Here, it takes time to calculate a route on which a vehicle is to travel because of a necessity for processing a vast amount of vehicle outdoor environment information. On the other hand, from the viewpoint of travel stability, traveling devices need to be controlled precisely in accordance with conditions such as a road condition, and thus, the control of the traveling devices needs to be performed as fast as possible. A large number of traveling devices are employed, such as an ignition plug, a fuel injection valve, and a valve mechanism for intake and exhaust valves, in an engine alone. Thus, in calculating controlled variables of these devices as well as calculating a route by one computation device (i.e., computation circuitry, application specific or programmable), the amount of calculation is enormous, and it takes time before outputting control signals to the traveling devices. Consequently, responsiveness of the traveling devices to environments outside the vehicle might degrade.

The techniques disclosed here have been made in view of the foregoing situations, and responsiveness of a traveling device to vehicle outdoor environments in a vehicle travel control device that controls actuation of the traveling device is enhanced so as to follow a route calculated by a computation device.

Solutions to the Problem

To solve problems described above, as well as other problems, techniques are disclosed herein that provide a configuration of a vehicle travel control device. A vehicle travel control device includes computation circuitry, and a device controller that controls actuation of a traveling device mounted on a vehicle, based on a result from the computation circuitry. The computation circuitry identifies a vehicle outdoor environment based on an output from image circuitry that acquires image information of vehicle outdoor environment, sets a route on which the vehicle is to travel, in accordance with the vehicle outdoor environment previously identified, determines a target motion of the vehicle to follow the route previously set, calculates a target physical quantity to be executed by the traveling device to achieve the target motion previously determined, and calculates a controlled variable of the traveling device such that the target physical quantity calculated is achieved, and the device controller outputs a control signal to the traveling device so as to control the traveling device to control a motion of the vehicle.

With this configuration, the computation device (also referred to as computational circuitry) only calculates the physical quantity to be achieved, and an actual controlled variable of the traveling device is calculated by the device controller. Accordingly, the amount of calculation of the computation device decreases so that the calculation speed of the computation device can be increased. The device controller only needs to calculate an actual controlled variable and output a control signal to the traveling device. Thus, a processing speed thereof is high. Consequently, responsiveness of the traveling device to the vehicle outdoor environment can be increased.

Since the device controller calculates the controlled variable, the computation device only needs to calculate a rough physical quantity. Thus, the computation speed may be lower than that of the device controller. As a result, computation accuracy of the computation device can be enhanced.

Since the device controller calculates a controlled variable, the vehicle travel control device can cope with a slight change of the vehicle outdoor environment by adjusting the controlled variable by using the device controller without using the computation device.

The "traveling devices" herein refer to devices such as actuators and sensors that are controlled while the vehicle is in motion.

The computation device for automobile may further include an abnormality detector configured to detect an abnormality in traveling of the vehicle, and when the abnormality detector detects an abnormality, the device controller may calculate a controlled variable of the traveling device in order to eliminate or reduce the abnormality, and outputs a control signal to traveling device.

That is, when slipping of wheels occur, for example, it is desirable to take immediate action in order to stabilize traveling. With this configuration, when an abnormality is detected, the device controller calculates a controlled variable for eliminating or reducing the abnormality without waiting for calculation of the computation device, and outputs a control signal to the traveling device. Consequently, responsiveness of the traveling device to the vehicle outdoor environment can be further enhanced.

In the computation device for automobile, the circuitry implements several different devices. For example, the traveling device comprises a power train-related device constituting a power train device, a brake-related device constituting a braking device, and a steering-related device constituting a steering device, the device controller comprises a power train controller configured to control actuation of the power train-related device, a brake controller configured to control actuation of the brake-related device, and a steering controller configured to control actuation of the steering-related device, and the power train controller, the brake controller, and the steering controller are configured to be communicable with one another, and share information on physical quantities generated by the power train controller, the brake controller, and the steering controller.

With this configuration, stability in traveling of the vehicle can be enhanced. For example, in a state where a road is slippery, for example, it is required to reduce the rotation speed of the wheels (i.e., so-called traction control) in order to prevent idle rotation of the wheels. To reduce idle rotation of the wheels, an output of the power train device is reduced or a braking force of the braking device is used. However, when the power train controller and the brake controller are communicable with each other, optimum action using both the power train device and the braking device can be taken. In turning a corner, for example, controlled variables of the power train-related device and the brake-related device are finely adjusted in accordance with a target steering variable of the steering device so that an appropriate lateral force can be applied to the vehicle, and smooth cornering can be performed. As a result, responsiveness of the traveling device to the vehicle outdoor environment can be further enhanced.

In the computation device for automobile, the vehicle outdoor environment identifier may identify a vehicle outdoor environment by using deep learning.

With this configuration, since the vehicle outdoor environment identifier identify the vehicle outdoor environment by using deep learning, the computation device performs an especially large amount of computation. In view of this, the controlled variable of the traveling device is calculated by the device controller other than the computation device so that the advantage of further enhancing responsiveness of the traveling device to the vehicle outdoor environment can be more appropriately obtained.

Advantages

As described above, exemplary techniques disclosed herein can enhance responsiveness of a traveling device to vehicle outdoor environment (i.e., an environment external to the vehicle) in a vehicle travel control device that controls operation of the traveling device so as to follow a route calculated by a computation device.

DESCRIPTION OF EMBODIMENTS

An exemplary embodiment will be described hereinafter in detail with reference to the drawings. A "traveling device" described later in this embodiment refers to devices such as actuators and sensors that are controlled when a vehicle 1 is travelling.

Figure 1:
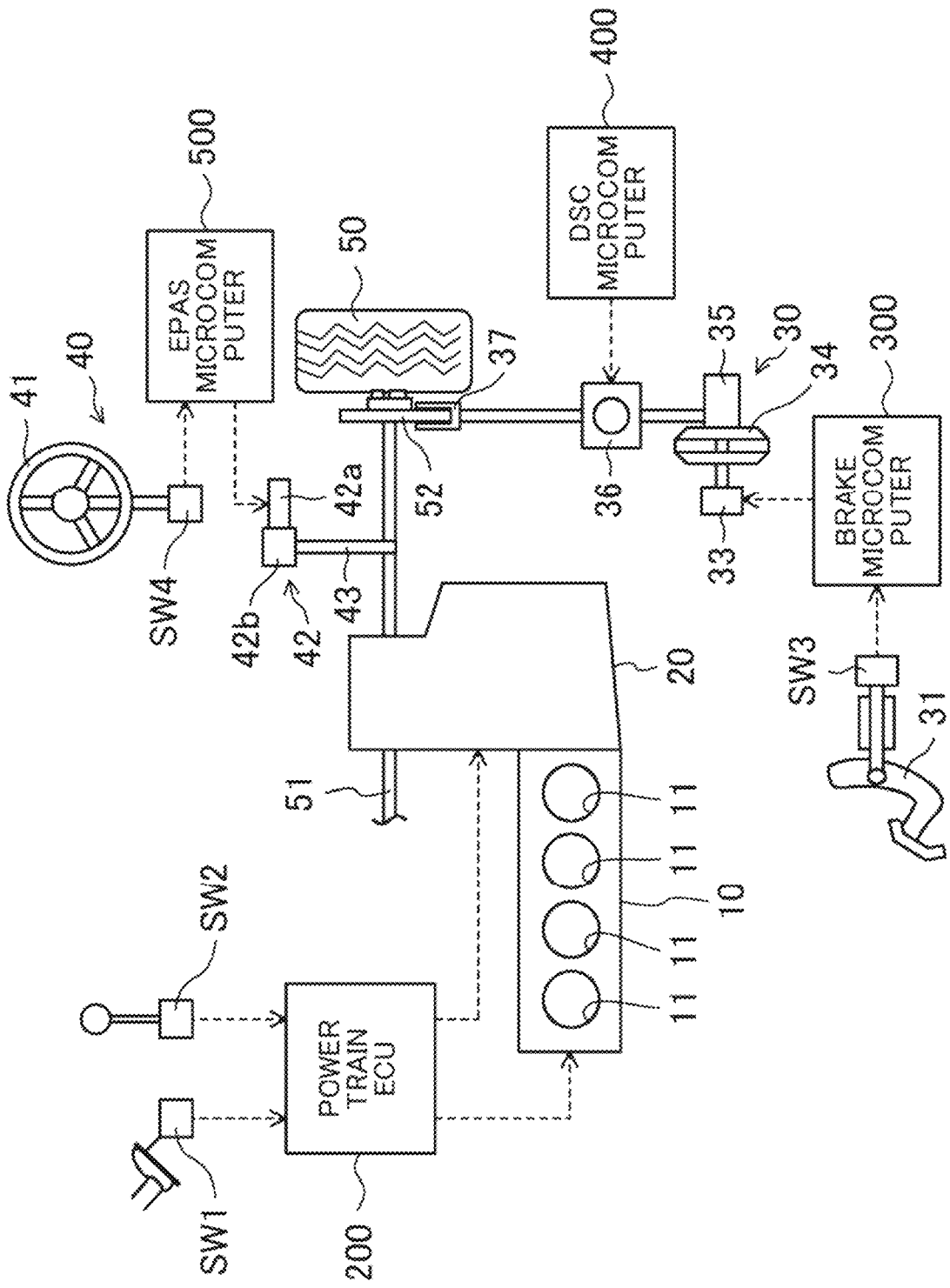
FIG. 1 A view schematically illustrating a configuration of a vehicle controlled by a vehicle travel control device according to an exemplary embodiment.
Figure 4:
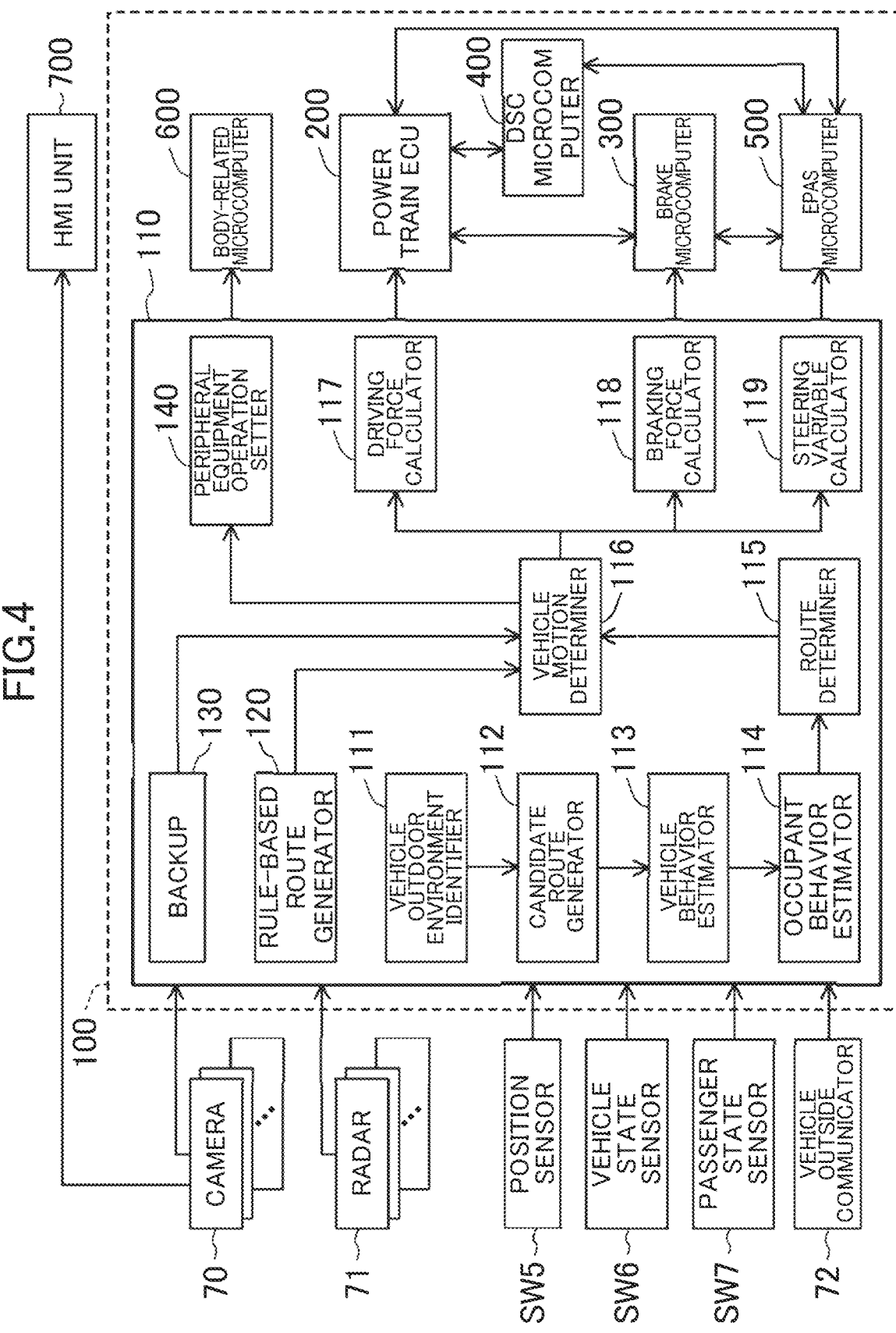
FIG. 4 A block diagram illustrating a control system of an automobile.

FIG. 1 schematically illustrates a configuration of the vehicle 1 that is controlled by a vehicle travel control device 100 (hereinafter referred to as a travel control device 100, as illustrated in FIG. 4 and the travelling device of FIG. 5) according to this embodiment. The vehicle 1 is an automobile capable of operating in manual driving of traveling in accordance with an operation of, for example, an accelerator by a driver, assisted driving of traveling while assisting an operation by the driver, and automated driving of traveling without an operation by the driver.

The vehicle 1 includes an engine 10 serving as a driving source and including a plurality of (four in this embodiment) cylinders 11, a transmission 20 coupled to the engine 10, a braking device 30 that brakes rotation of front wheels 50 as driving wheel, and a steering device 40 that steers the front wheels 50 as steered wheels.

Figure 2:
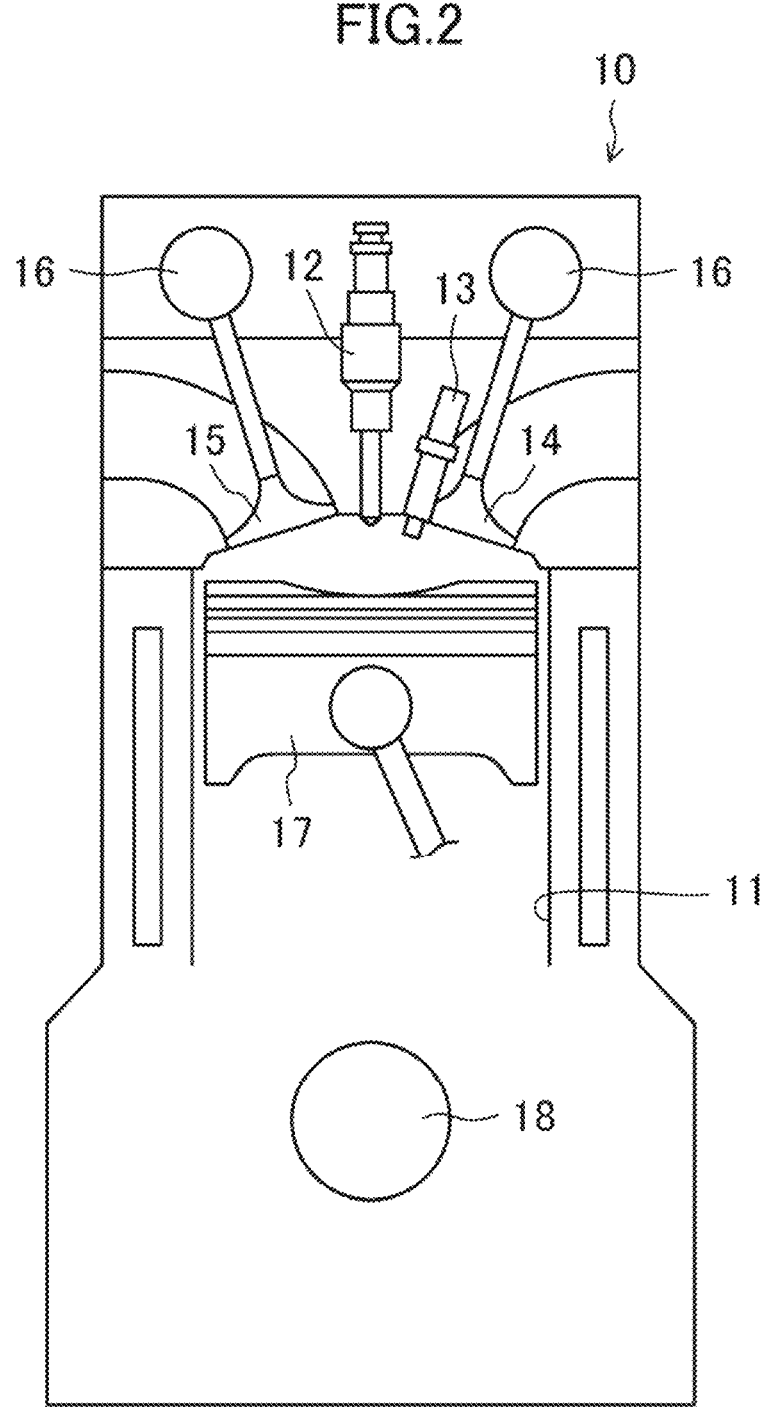
FIG. 2 A schematic view illustrating a configuration of an engine.

The engine 10 is, for example, a gasoline engine. As illustrated in FIG. 2, each of the cylinders 11 of the engine 10 is provided with an injector 12 for supplying fuel into the cylinder 11 and an ignition plug 13 for igniting an air-fuel mixture of fuel and intake air supplied into the cylinder 11. The engine 10 includes, for each of the cylinders 11, an intake valve 14, an exhaust valve 15, and a valve mechanism 16 for adjusting opening/closing operations of the intake valve 14 and the exhaust valve 15. The engine 10 also includes a piston 17 that reciprocates in the cylinders 11, and a crankshaft 18 coupled to the piston 17 through a connecting rod. The engine 10 may be a diesel engine. In the case where the engine 10 is the diesel engine, the ignition plug 13 may not be provided. The injector 12, the ignition plug 13, and the valve mechanism 16 are examples of power train-related devices.

The transmission 20 is, for example, a multistep automatic transmission. The transmission 20 is disposed at one side of the cylinder line of the engine 10. The transmission 20 includes an input shaft (not shown) coupled to the crankshaft 18 of the engine 10 and an output shaft (not shown) coupled to the input shaft through a plurality of speed-reducing gears (not shown). The output shaft is coupled to an axle 51 of the front wheels 50. Rotation of the crankshaft 18 is subjected to a gear shift by the transmission 20, and is transferred to the front wheels 50. The transmission 20 is an example of a power train-related device.

The engine 10 and the transmission 20 are power train devices that generate a driving force for enabling the vehicle 1 to travel. Actuation of the engine 10 and the transmission 20 is controlled by a power train electric control unit (ECU) 200, which includes programmable circuitry to execute power train related calculations and output control signals that control an operation of the power train. As used herein, the term "circuitry" may be one or more circuits that optionally include programmable circuitry. For example, while the vehicle 1 is in the manual driving, the power train ECU 200 controls, for example, a fuel injection amount and a fuel injection timing by the injector 12, an ignition timing by the ignition plug 13, and valve open timings and valve open periods of the intake and exhaust valves 14 and 15 by the valve mechanism 16, based on detection values of, for example, an accelerator opening sensor SW1 for detecting an accelerator opening corresponding to a manipulated variable of an accelerator pedal by the driver. While the vehicle 1 is in the manual driving, the power train ECU 200 adjusts a gear stage of the transmission 20 based on a detection result of a shift sensor SW2 for detecting an operation of a shift lever by the driver and a required driving force calculated from an accelerator opening. While the vehicle 1 is in the assisted driving or the automated driving, the power train ECU 200 basically calculates controlled variables of traveling devices (e.g., the injector 12 in this embodiment) such that a target driving force calculated by a computation device 110 described later can be obtained, and outputs a control signal to the traveling devices. The power train ECU 200 is an example of a device controller, or device control circuitry.

The braking device 30 includes a brake pedal 31, a brake actuator 33, a booster 34 connected to the brake actuator 33, a master cylinder 35 connected to the booster 34, a dynamic stability control (DSC) device 36 (or DSC circuitry) for adjusting a braking force, and brake pads 37 for actually braking rotation of the front wheels 50. The axle 51 of the front wheels 50 is provided with disc rotors 52. The braking device 30 is an electric brake, and actuates the brake actuator 33 in accordance with a manipulated variable of the brake pedal 31 detected by a brake sensor SW3, and actuates the brake pads 37 through the booster 34 and the master cylinder 35. The braking device 30 causes the disc rotors 52 to be sandwiched by the brake pads 37 and brakes rotation of the front wheels 50 by a friction force occurring between the brake pads 37 and the disc rotors 52. The brake actuator 33 and the DSC device 36 are examples of brake-related devices.

Actuation of the braking device 30 is controlled by a brake microcomputer 300 and a DSC microcomputer 400, also referred to as brake control circuitry and DSC circuitry, for example. For example, while the vehicle 1 is in the manual driving, the brake microcomputer 300 controls a manipulated variable of the brake actuator 33 based on detection values of, for example, the brake sensor SW3 for detecting a manipulated variable of the brake pedal 31 by the driver. The DSC microcomputer 400 controls actuation of the DSC device 36 irrespective of operation of the brake pedal 31 by the driver, and applies a braking force to the front wheels 50. While the vehicle 1 is in the assisted driving or the automated driving, the brake microcomputer 300 basically calculates controlled variables of traveling devices (e.g., the brake actuator 33 in this embodiment) such that a target braking force calculated by the computation device 110 described later can be obtained, and outputs control signals to the traveling devices. The brake microcomputer 300 and the DSC microcomputer 400 are examples of a device controller. The brake microcomputer 300 and the DSC microcomputer 400 may be constituted by one microcomputer.

The steering device 40 includes a steering wheel 41 that is operated by the driver, an electronic power assist steering (EPAS) device 42 (or EPAS circuitry, such as a microcomputer) for assisting a steering operation by the driver, and a pinion shaft 43 coupled to the EPAS device 42. The EPAS device 42 includes an electric motor 42a and a speed reducer 42b that reduces the speed of a driving force of the electric motor 42a and transfers the resulting driving force to the pinion shaft 43. The steering device 40 is a steer-by-wire steering device, and actuates the EPAS device 42 in accordance with a manipulated variable of the steering wheel 41 detected by a steering angle sensor SW4, and operates the front wheels 50 by rotating the pinion shaft 43. The pinion shaft 43 and the front wheels 50 are coupled to each other by an unillustrated rack bar, and rotation of the pinion shaft 43 is transferred to the front wheels through the rack bar. The EPAS device 42 is an example of a steering-related device.

Actuation of the steering device 40 is controlled by the EPAS microcomputer 500. For example, while the vehicle 1 is in the manual driving, the EPAS microcomputer 500 controls a manipulated variable of the electric motor 42a based on detection values of, for example, the steering angle sensor SW4. While the vehicle 1 is in the assisted driving or the automated driving, the EPAS microcomputer 500 basically calculates controlled variables of traveling devices (e.g., the EPAS device 42 in this embodiment) such that a target steering variable calculated by the computation device 110 described later can be obtained, and outputs control signals to the traveling devices. The EPAS microcomputer 500 is an example of a device controller.

Although specifically described later, in this embodiment, the power train ECU 200, the brake microcomputer 300, the DSC microcomputer 400, and the EPAS microcomputer 500 are configured to be communicable with one another. In the following description, the power train ECU 200, the brake microcomputer 300, the DSC microcomputer 400, and the EPAS microcomputer 500 will be simply referred to as device controllers, or device control circuitry.

Figure 3:
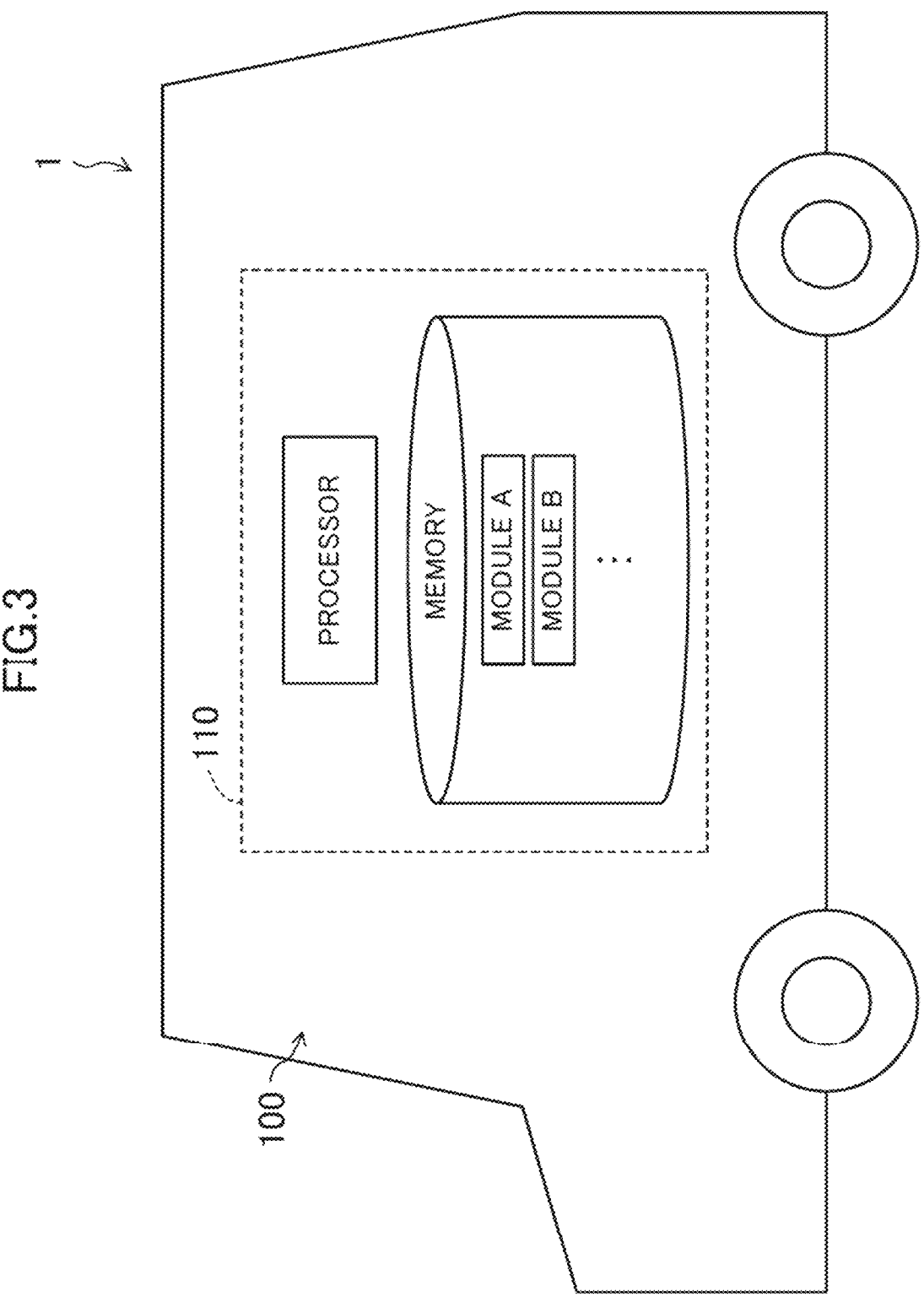
FIG. 3 A schematic view illustrating a vehicle on which a computation device is mounted.

In this embodiment, to enable the assisted driving and the automated driving, the travel control device 100 includes a computation device 110 (FIGS. 3 and 4) that calculates a route on which the vehicle 1 is to travel and that determines a motion of the vehicle 1 for following the route. The computation device 110 is a computation hardware including one or more chips. Specifically, as illustrated in FIG. 3, the computation device 110 includes a memory and a processor including a CPU and a plurality of memory modules (compartmentalized memory that holds different computer code that is readably and executable by the processor).

FIG. 4 illustrates a configuration for implementing a function (a route generating function described later) according to this embodiment in further detail. FIG. 4 does not illustrate all the functions of the computation device 110.

The computation device 110 determines a target motion of the vehicle 1 and controls actuation of a device base on an output from, for example, a plurality of sensors. The sensors for outputting information to the computation device 110, for example, include: a plurality of cameras 70 disposed on, for example, the body of the vehicle 1 and used for taking images of vehicle outdoor environments; a plurality of radars 71 disposed on, for example, the body of the vehicle 1 and used for detecting an object outside the vehicle and other objects; a position sensor SW5 for detecting a position of the vehicle 1 (vehicle position information) by utilizing global positioning system (GPS); a vehicle state sensor SW6 constituted by outputs of sensors for detecting a vehicle behavior, such as a vehicle speed sensor, an acceleration sensor, and a yaw rate sensor, and used for acquiring a state of the vehicle 1; and an occupant state sensor SW7 constituted by, for example, an in-car camera and used for acquiring a state of an occupant of the vehicle 1. The computation device 110 receives communication information received by a vehicle outside communicator 72 and sent from another vehicle around the own vehicle, and traffic information received by the vehicle outside communicator 72 and sent from a navigation system.

Each of the cameras 70 is disposed to capture an image around the vehicle 1 by 360° horizontally. Each camera 70 captures an optical image representing vehicle outdoor environments and generates image data. Each camera 70 outputs the generated image data to the computation device 110. The cameras 70 are examples of an image acquirer that acquires information on vehicle outdoor environments.

The image data acquired by the cameras 70 is input to a human machine interface (HMI) unit 700 as well as the computation device 110. The HMI unit 700 displays information based on the acquired image data on, for example, a display device.

In a manner similar to the cameras 70, each of the radars 71 is disposed to detect an image in a range around the vehicle 1 by 360° horizontally. The radars 71 are not limited to a specific type, and a millimeter wave radar or an infrared ray radar may be employed. The radars 71 are an example of the image acquirer that acquires vehicle outdoor environments.

While the vehicle 1 is in the assisted driving or the automated driving, the computation device 110 sets a travel route of the vehicle 1 and sets a target motion of the vehicle 1 such that the vehicle 1 follows the travel route. The computation device 110 includes: an vehicle outdoor environment identifier 111 (or vehicle outdoor environment identifier circuity) that identifies a vehicle outdoor environment based on an output from, for example, the cameras 70 in order to set a target motion of the vehicle 1; a candidate route generator 112 (or candidate route generation circuitry 112) that calculates one or more candidate routes on which the vehicle 1 is capable of traveling, in accordance with the vehicle outdoor environment determined by the vehicle outdoor environment identifier 111 (or vehicle outdoor environment identification circuitry); a vehicle behavior estimator 113 (or vehicle behavior estimation circuitry) that estimates a behavior of the vehicle 1 based on an output from the vehicle state sensor SW6; an occupant behavior estimator 114 (or occupant behavior estimation circuitry) that estimates a behavior or an occupant of the vehicle 1 based on an output from the occupant state sensor SW7; a route determiner 115 (or route determination circuitry) that determines a route on which the vehicle 1 is to travel; a vehicle motion determiner 116 (vehicle motion determination circuitry) that determines a target motion of the vehicle 1 in order to allow the vehicle 1 to follow the route set by the route determiner 115; and a driving force calculator 117 (driving force calculation circuitry), a braking force calculator 118 (brake force calculation circuitry), and a steering variable calculator 119 (or steering variable calculation circuitry) that calculates target physical quantities (e.g., a driving force, a braking force, and a steering angle) to be generated by the traveling devices in order to obtain the target motion determined by the driving force calculator vehicle motion determiner 116. The candidate route generator 112, the vehicle behavior estimator 113, the occupant behavior estimator 114, and the route determiner 115 constitute a route setter that sets a route on which the vehicle 1 is to travel, in accordance with the vehicle outdoor environment identified by the vehicle outdoor environment identifier 111. As will be described in more detail below, the computation device 110 includes the vehicle outdoor environment identifier 111 (aspects of which are further described in U.S. application Ser. No. 17/120,292 filed Dec. 14, 2020, and U.S. application Ser. No. 17/160,426 filed Jan. 28, 2021, the entire contents of each of which being incorporated herein by reference), an occupant behavior estimator 114 (aspects of which are further described in U.S. application Ser. No. 17/103,990 filed Nov. 25, 2020, the entire contents of which being incorporated herein by reference), a route determiner 115 (aspects of which are further described in more detail in U.S. application Ser. No. 17/161,691, filed 29 Jan. 2021, U.S. application Ser. No. 17/161,686, filed 29 Jan. 2021, and U.S. application Ser. No. 17/161,683, the entire contents of each of which being incorporated herein by reference), a vehicle motion determiner 116 (aspects of which are further described in more detail in U.S. application Ser. No. 17/159,178, filed Jan. 27, 2021, the entire contents of which being incorporated herein by reference), a candidate route generator 112 (aspects of which are further described in more detail in U.S. application Ser. No. 17/159,178, supra). The computation device 110 includes other features as well, as will be discussed herein.

The computation device 110 also includes, as safety functions, a rule-based route generator 120 (or rule-based route generation circuitry) that identifies an object outside the vehicle according to a predetermined rule and generates a travel route that avoids the object, and a backup 130 that generates a travel route for guiding the vehicle 1 to a safe area such as a road shoulder.

Figure 7:
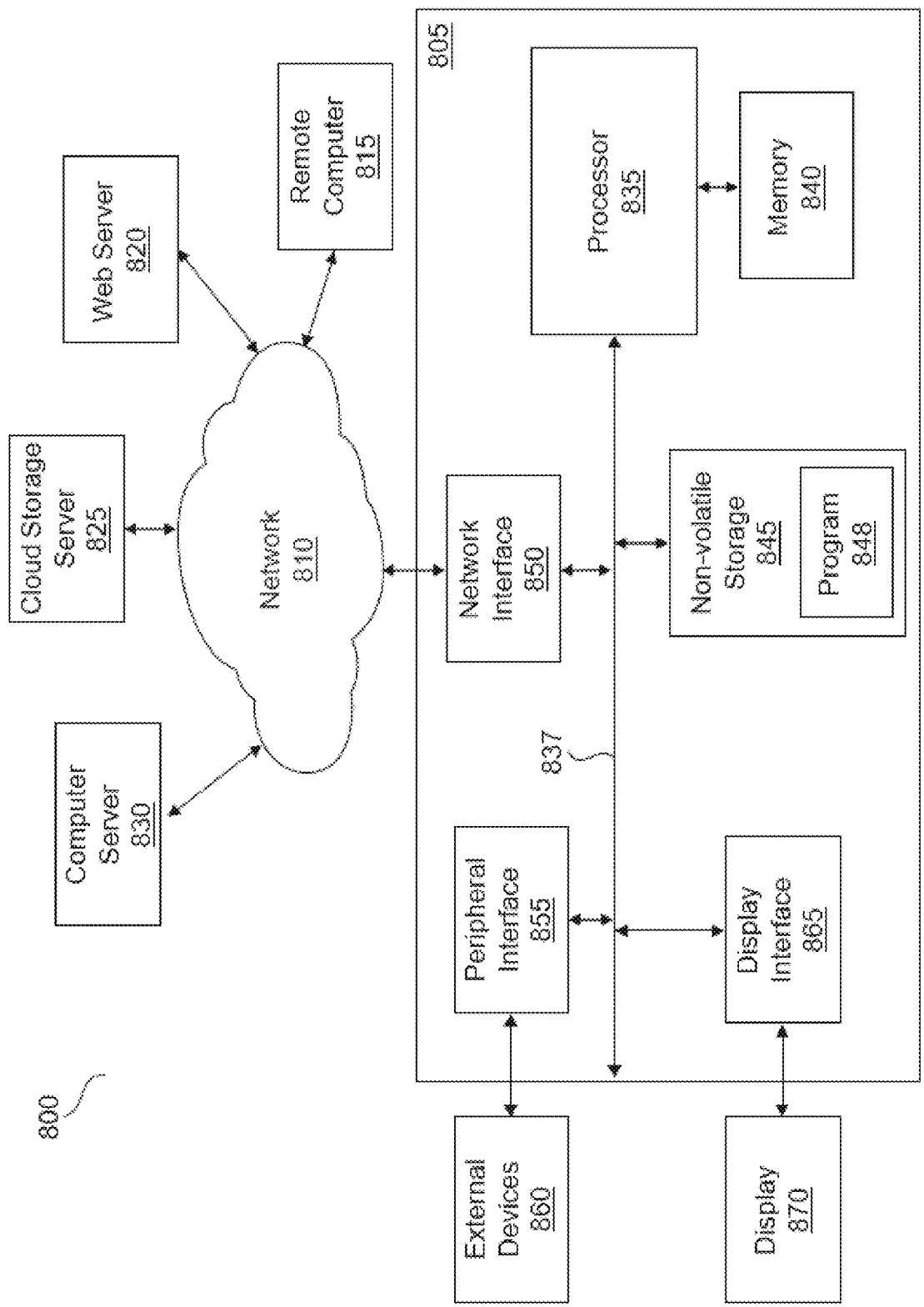
FIG. 7 A diagram of a computer structure that implements the various circuitry (programmable and discrete) in the computation device according to the various embodiments.

The vehicle outdoor environment identifier 111, the candidate route generator 112, the vehicle behavior estimator 113, the occupant behavior estimator 114, the route determiner 115, the vehicle motion determiner 116, the driving force calculator 117, the braking force calculator 118, the steering variable calculator 119, the rule-based route generator 120, and the backup 130 are examples of modules stored in a memory 102, include the computer readable code that when executed by a processor provide the processor with the structure to perform the relevant functions FIG. 7 illustrates a block diagram of a computer that may implement the various embodiments described herein.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 7 is a functional block diagram illustrating a networked system 800 of one or more networked computers and servers. In an embodiment, the hardware and software environment illustrated in FIG. 7 may provide an exemplary platform for implementation of the software and/or methods according to the present disclosure.

Referring to FIG. 7, a networked system 800 may include, but is not limited to, computer 805, network 810, remote computer 815, web server 820, cloud storage server 825 and computer server 830. In some embodiments, multiple instances of one or more of the functional blocks illustrated in FIG. 7 may be employed.

Additional detail of computer 805 is shown in FIG. 7. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

<Vehicle Outdoor Environment Identifier>

The vehicle outdoor environment identifier 111 receives outputs from, for example, the cameras 70 and the radars 71 mounted on the vehicle 1, and identifies a vehicle outdoor environment. The identified vehicle outdoor environment includes at least a road and an obstacle. In this embodiment, the vehicle outdoor environment identifier 111 compares three-dimensional information on surroundings of the vehicle 1 with a vehicle outdoor environment model, based on data of the cameras 70 and the radars 71 to thereby estimate a vehicle environment including a road and an obstacle. The vehicle outdoor environment model is, for example, a learned model generated by deep learning, and is capable of recognizing a road, an obstacle, and other objects with respect to three-dimensional information on surroundings of the vehicle.

In a non-limiting example, a process is described about how a learned model is trained, according to the present teachings. The example will be in the context of a vehicle external environment estimation circuitry (e.g., a trained model saved in a memory and applied by a computer). However, other aspects of the trained model for object detection/avoidance, route generation, controlling steering, braking, etc., are implemented via similar processes to acquire the learned models used in the components of the computational device 110. Hereinafter, as part of a process for determining how a computing device 1000 calculates a route path (R2, R13, R12, or R11 for example on a road 5) in the presence of an obstacle 3 (another vehicle) surrounded by a protection zone (see dashed line that encloses unshaded area) will be explained. In this example, the obstacle 3 is a physical vehicle that has been captured by a forward looking camera from the trailing vehicle 1. The model is hosted in a single information processing unit (or single information processing circuitry).

Figure 8:
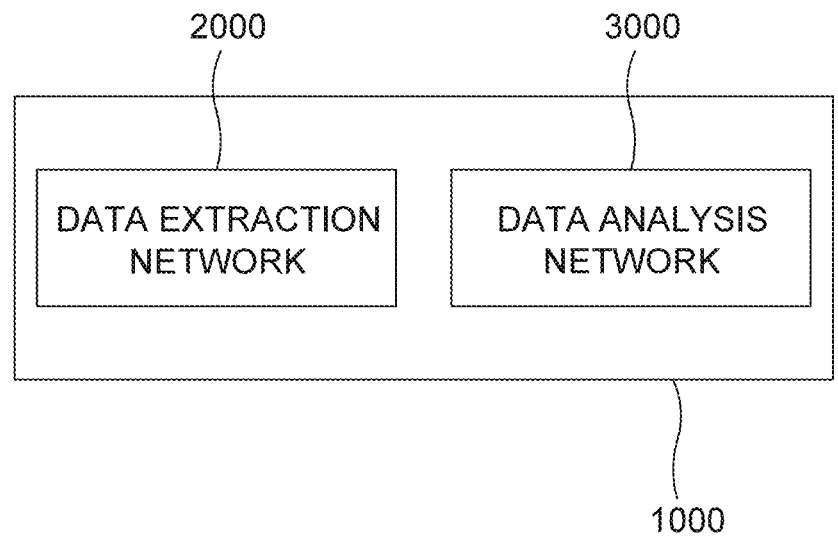
FIG. 8 is a diagram of an AI-based computer architecture according to an embodiment.

First, by referring to FIG. 8, a configuration of the computing device 1000 will be explained.

The computing device 1000 may include a data extraction network 2000 and a data analysis network 3000. Further, to be illustrated in FIG. 10, the data extraction network 2000 may include at least one first feature extracting layer 2100, at least one Region-Of-Interest (ROI) pooling layer 2200, at least one first outputting layer 2300 and at least one data vectorizing layer 2400. And, also to be illustrated in FIG. 8, the data analysis network 3000 may include at least one second feature extracting layer 3100 and at least one second outputting layer 3200. Below, an aspect of calculating a safe route (e.g. R13), around a protection zone that surrounds the obstacle will be explained. Moreover, the specific aspect is to learn a model to detect obstacles (e.g., vehicle 1) on a roadway, and also estimate relative distance to a superimposed protection range that has been electronically superimposed about the vehicle 3 in the image. To begin with, a first embodiment of the present disclosure will be presented.

Figure 9:
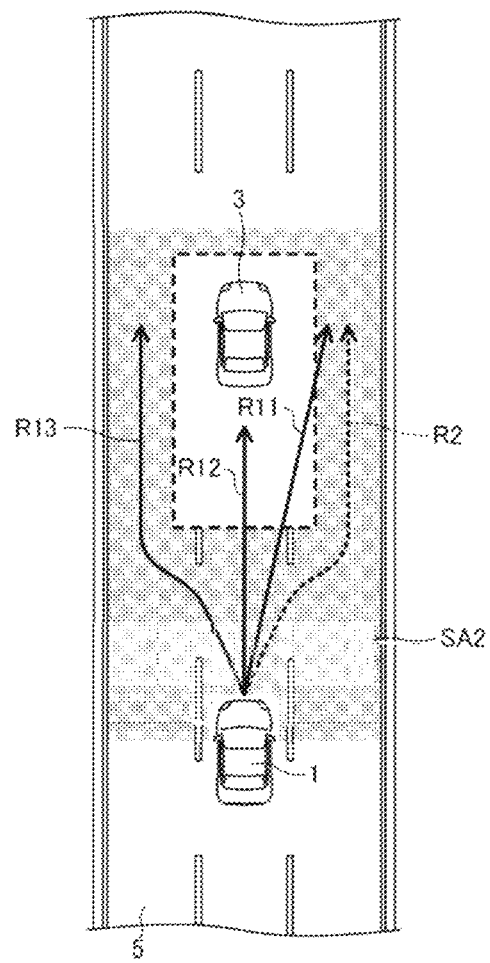
FIG. 9 is an example diagram of an image used for training a model to detect distance to an obstacle and a protection zone around the obstacle.

First, the computing device 1000 may acquire at least one subject image that includes a superimposed protection zone about the subject vehicle 3. By referring to FIG. 9, the subject image may correspond to a scene of a highway, photographed from a vehicle 1 that is approaching another vehicle 3 from behind on a three lane highway.

After the subject image is acquired, in order to generate a source vector to be inputted to the data analysis network 3000, the computing device 1000 may instruct the data extraction network 2000 to generate the source vector including (i) an apparent distance, which is a distance from a front of vehicle 1 to a back of the protection zone surrounding vehicle 3, and (ii) an apparent size, which is a size of the protection zone.

In order to generate the source vector, the computing device 1000 may instruct at least part of the data extraction network 2000 to detect the obstacle 3 (vehicle) and protection zone.

Specifically, the computing device 1000 may instruct the first feature extracting layer 2100 to apply at least one first convolutional operation to the subject image, to thereby generate at least one subject feature map. Thereafter, the computing device 1000 may instruct the ROI pooling layer 2200 to generate one or more ROI-Pooled feature maps by pooling regions on the subject feature map, corresponding to ROIs on the subject image which have been acquired from a Region Proposal Network (RPN) interworking with the data extraction network 2000. And, the computing device 1000 may instruct the first outputting layer 2300 to generate at least one estimated obstacle location and one estimated protection zone region. That is, the first outputting layer 2300 may perform a classification and a regression on the subject image, by applying at least one first Fully-Connected (FC) operation to the ROI-Pooled feature maps, to generate each of the estimated obstacle location and protection zone region, including information on coordinates of each of bounding boxes. Herein, the bounding boxes may include the obstacle and a region around the obstacle (protection zone).

After such detecting processes are completed, by using the estimated obstacle location and the estimated protection zone location, the computing device 1000 may instruct the data vectorizing layer 2400 to subtract a y-axis coordinate (distance in this case) of an upper bound of the obstacle from a y-axis coordinate of the closer boundary of the protection zone to generate the apparent distance, and multiply a distance of the protection zone and a horizontal width of the protection zone to generate the apparent size of the protection zone.

After the apparent distance and the apparent size are acquired, the computing device 1000 may instruct the data vectorizing layer 2400 to generate at least one source vector including the apparent distance and the apparent size as its at least part of components.

Then, the computing device 1000 may instruct the data analysis network 3000 to calculate an estimated actual protection zone by using the source vector. Herein, the second feature extracting layer 3100 of the data analysis network 3000 may apply second convolutional operation to the source vector to generate at least one source feature map, and the second outputting layer 3200 of the data analysis network 3000 may perform a regression, by applying at least one FC operation to the source feature map, to thereby calculate the estimated protection zone.

As shown above, the computing device 1000 may include two neural networks, i.e., the data extraction network 2000 and the data analysis network 3000. The two neural networks should be trained to perform the processes properly, and thus below it is described how to train the two neural networks by referring to FIG. 10 and FIG. 11.

Figure 10:
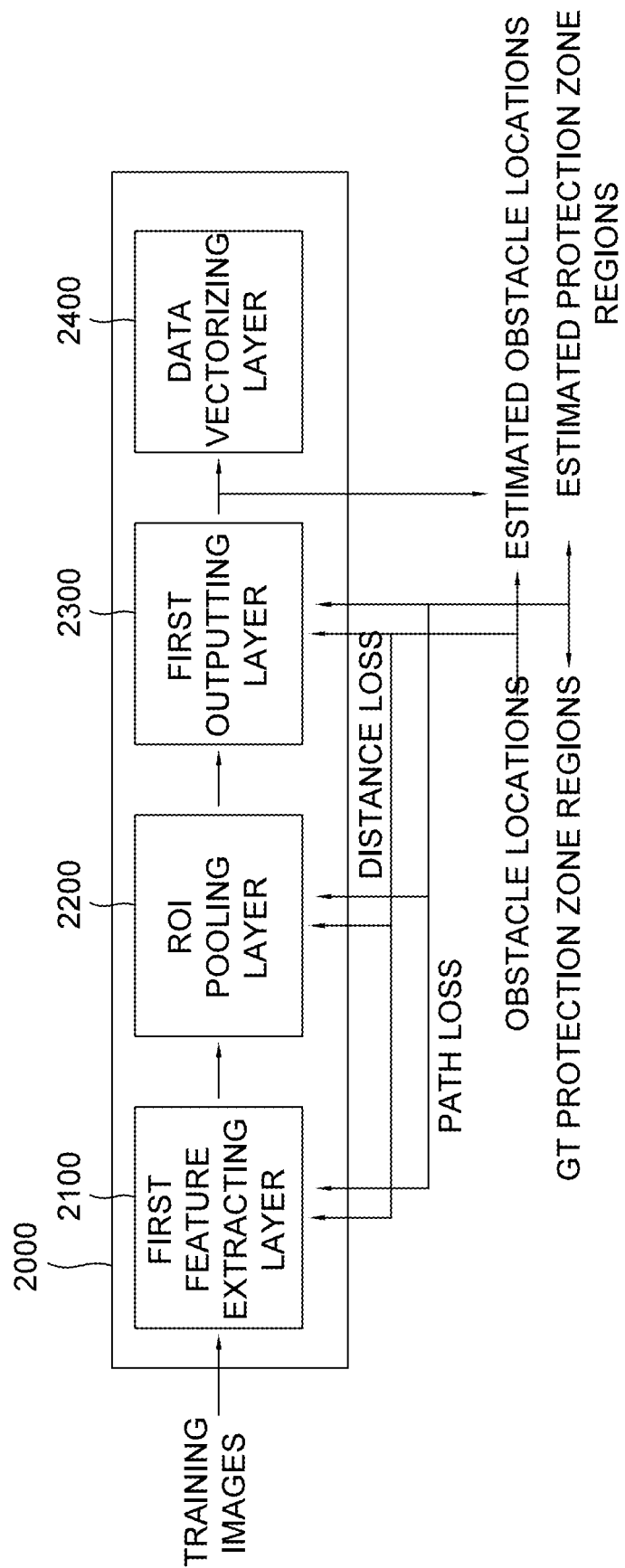
FIG. 10 is a diagram of a data extraction network according to an embodiment.
Figure 11:
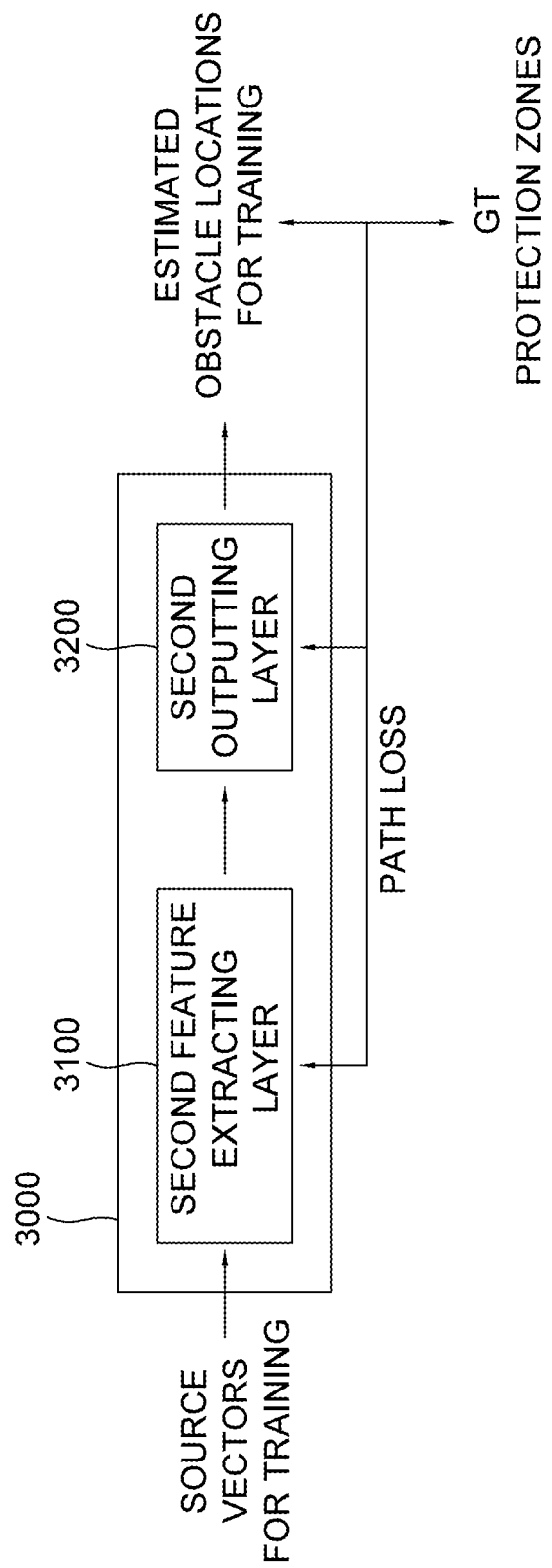
FIG. 11 is a diagram of a data analysis network according to an embodiment.

First, by referring to FIG. 10, the data extraction network 2000 may have been trained by using (i) a plurality of training images corresponding to scenes of subject roadway conditions for training, photographed from fronts of the subject vehicles for training, including images of their corresponding projected protection zones (protection zones superimposed around a forward vehicle, which is an "obstacle" on a roadway) for training and images of their corresponding grounds for training, and (ii) a plurality of their corresponding GT obstacle locations and GT protection zone regions. The protection zones do not occur naturally, but are previously superimposed about the vehicle 3 via another process, perhaps a bounding box by the camera. More specifically, the data extraction network 2000 may have applied aforementioned operations to the training images, and have generated their corresponding estimated obstacle locations and estimated protection zone regions. Then, (i) each of obstacle pairs of each of the estimated obstacle locations and each of their corresponding GT obstacle locations and (ii) each of obstacle pairs of each of the estimated protection zone locations associated with the obstacles and each of the GT protection zone locations may have been referred to, in order to generate at least one vehicle path loss and at least one distance, by using any of loss generating algorithms, e.g., a smooth-L1 loss algorithm and a cross-entropy loss algorithm. Thereafter, by referring to the distance loss and the path loss, backpropagation may have been performed to learn at least part of parameters of the data extraction network 2000. Parameters of the RPN can be trained also, but a usage of the RPN is a well-known prior art, thus further explanation is omitted.

Herein, the data vectorizing layer 2400 may have been implemented by using a rule-based algorithm, not a neural network algorithm. In this case, the data vectorizing layer 2400 may not need to be trained, and may just be able to perform properly by using its settings inputted by a manager.

As an example, the first feature extracting layer 2100, the ROI pooling layer 2200 and the first outputting layer 2300 may be acquired by applying a transfer learning, which is a well-known prior art, to an existing object detection network such as VGG or ResNet, etc. Second, by referring to FIG. 11, the data analysis network 3000 may have been trained by using (i) a plurality of source vectors for training, including apparent distances for training and apparent sizes for training as their components, and (ii) a plurality of their corresponding GT protection zones. More specifically, the data analysis network 3000 may have applied aforementioned operations to the source vectors for training, to thereby calculate their corresponding estimated protection zones for training. Then each of distance pairs of each of the estimated protection zones and each of their corresponding GT protection zones may have been referred to, in order to generate at least one distance loss, by using said any of loss algorithms. Thereafter, by referring to the distance loss, backpropagation can be performed to learn at least part of parameters of the data analysis network 3000.

After performing such training processes, the computing device 1000 can properly calculate the estimated protection zone by using the subject image including the scene photographed from the front of the subject roadway.

Hereafter, another embodiment will be presented. A second embodiment is similar to the first embodiment, but different from the first embodiment in that the source vector thereof further includes a tilt angle, which is an angle between an optical axis of a camera which has been used for photographing the subject image (e.g., the subject obstacle) and a distance to the obstacle. Also, in order to calculate the tilt angle to be included in the source vector, the data extraction network of the second embodiment may be slightly different from that of the first one. In order to use the second embodiment, it should be assumed that information on a principal point and focal lengths of the camera are provided.

Specifically, in the second embodiment, the data extraction network 2000 may have been trained to further detect lines of a road in the subject image, to thereby detect at least one vanishing point of the subject image. Herein, the lines of the road may denote lines representing boundaries of the road located on the obstacle in the subject image, and the vanishing point may denote where extended lines generated by extending the lines of the road, which are parallel in the real world, are gathered. As an example, through processes performed by the first feature extracting layer 2100, the ROI pooling layer 220 and the first outputting layer 2300, the lines of the road may be detected.

After the lines of the road are detected, the data vectorizing layer 240 may find at least one point where the most extended lines are gathered, and determine it as the vanishing point. Thereafter, the data vectorizing layer 2400 may calculate the tilt angle by referring to information on the vanishing point, the principal point and the focal lengths of the camera by using a following formula:

$$\theta_{tilt} = atan2(vy-cy, fy)$$

In the formula, vy may denote a y-axis (distance direction) coordinate of the vanishing point, cy may denote a y-axis coordinate of the principal point, and fy may denote a y-axis focal length. Using such formula to calculate the tilt angle is a well-known prior art, thus more specific explanation is omitted.

After the tilt angle is calculated, the data vectorizing layer 2400 may set the tilt angle as a component of the source vector, and the data analysis network 3000 may use such source vector to calculate the estimated protection zone. In this case, the data analysis network 3000 may have been trained by using the source vectors for training additionally including tilt angles for training.

For a third embodiment which is mostly similar to the first one, some information acquired from a subject obstacle DB storing information on subject obstacles, including the subject obstacle, can be used for generating the source vector. That is, the computing device 1000 may acquire structure information on a structure of the subject vehicle, e.g., 4 doors, vehicle base length of a certain number of feet, from the subject vehicle DB. Or, the computing device 1000 may acquire topography information on a topography of a region around the subject vehicle, e.g., hill, flat, bridge, etc., from location information for the particular roadway. Herein, at least one of the structure information and the topography information can be added to the source vector by the data vectorizing layer 2400, and the data analysis network 3000, which has been trained by using the source vectors for training additionally including corresponding information, i.e., at least one of the structure information and the topography information, may use such source vector to calculate the estimated protection zone.

Figure 12:
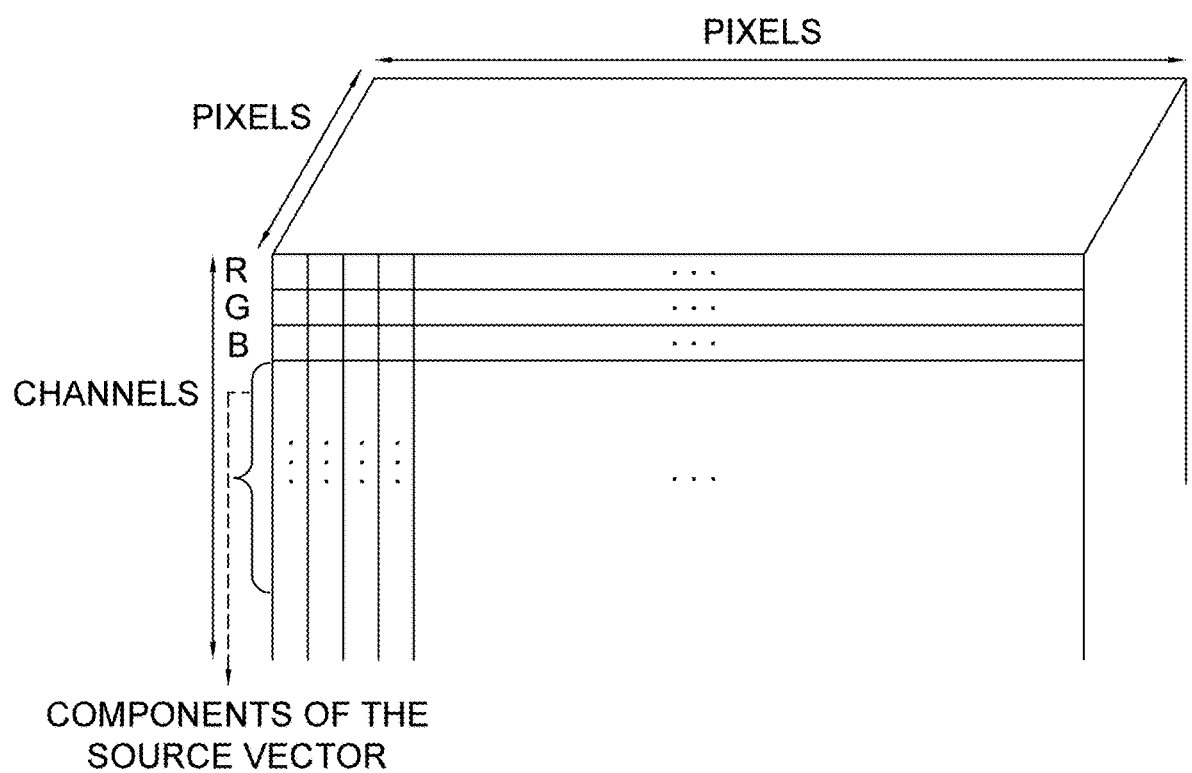
FIG. 12 is a diagram of a concatenated source feature map.

As a fourth embodiment, the source vector, generated by using any of the first to the third embodiments, can be concatenated channel-wise to the subject image or its corresponding subject segmented feature map, which has been generated by applying an image segmentation operation thereto, to thereby generate a concatenated source feature map, and the data analysis network 3000 may use the concatenated source feature map to calculate the estimated protection zone. An example configuration of the concatenated source feature map may be shown in FIG. 12. In this case, the data analysis network 3000 may have been trained by using a plurality of concatenated source feature maps for training including the source vectors for training, other than using only the source vectors for training. By using the fourth embodiment, much more information can be inputted to processes of calculating the estimated protection zone, thus it can be more accurate. Herein, if the subject image is used directly for generating the concatenated source feature map, it may require too much computing resources, thus the subject segmented feature map may be used for reducing a usage of the computing resources.

Descriptions above are explained under an assumption that the subject image has been photographed from the back of the subject vehicle, however, embodiments stated above may be adjusted to be applied to the subject image photographed from other sides of the subject vehicle. And such adjustment will be easy for a person in the art, referring to the descriptions.

The vehicle outdoor environment identifier 111 specifies free space or a region where no objects are present through image processing, from images captured by the cameras 70. In the image processing herein, a learned model generated by, for example, deep learning is used, such as according to the processes discussed above with respect to FIG. 8 through FIG. 12. Then, a two-dimensional map representing a free space is generated. The vehicle outdoor environment identifier 111 acquires information on a target around the vehicle 1, from outputs of the radars 71. This information is positioning information including a position and a speed, for example, of the target. Thereafter, the vehicle outdoor environment identifier 111 combines the generated two-dimensional map with the positioning information of the target, and generates a three-dimensional map representing surroundings around the vehicle 1. In this embodiment, information on locations and image-capturing directions of the cameras 70, and information on locations and transmission directions of the radars 71 are used. The vehicle outdoor environment identifier 111 compares the generated three-dimensional map with the vehicle outdoor environment model to thereby estimate a vehicle environment including a road and an obstacle. In deep learning, a deep neural network (DNN) is used. Examples of the DNN include convolutional neural network (CNN).

<Candidate Route Generator>

The candidate route generator 112 generates candidate routes on which the vehicle 1 can travel, based on, for example, an output of the vehicle outdoor environment identifier 111, an output of the position sensor SW5, and information transmitted from the vehicle outside communicator 72. For example, the candidate route generator 112 generates a travel route that avoids an obstacle identified by the vehicle outdoor environment identifier 111 on a road identified by the vehicle outdoor environment identifier 111. The output of the vehicle outdoor environment identifier 111 includes travel route information on a travel route on which the vehicle 1 travels, for example. The travel route information includes information on a shape of the travel route itself and information on an object on the travel route. The information on the shape of the travel route includes, for example, a shape (linear, curve, or curve curvature), a travel route width, the number of lanes, and a lane width of the travel route. The information on the object includes, for example, a relative position and a relative speed of the object with respect to the vehicle, and attributes (e.g., types and direction of movement) of the object. Examples of the type of the object include a vehicle, a pedestrian, a road, and a mark line.

In this embodiment, the candidate route generator 112 calculates a plurality of candidate routes by a state lattice method, and based on a route cost of each of the calculated candidate routes, selects one or more candidate routes. The routes may be calculated by other methods.

The candidate route generator 112 sets an imaginary grid area on a travel route based on travel route information. This grid area includes a plurality of grid points. With each of the grid points, a position on the travel route is specified. The candidate route generator 112 sets a predetermined grid point as a target arrival position. Then, the candidate route generator 112 computes a plurality of candidate routes by a route search using the plurality of grid points in the grid area. In the state lattice method, a route is branched from a given grid point to another grid point located ahead of the given grid point in the traveling direction of the vehicle. Thus, the candidate routes are set so as to pass the plurality of grid points sequentially. The candidate routes include, for example, time information representing times when the vehicle passes the grid points, speed information on, for example, speeds and accelerations at the grid points, and information on other vehicle motions.

The candidate route generator 112 selects one or more travel routes based on a route cost from the plurality of candidate routes. Examples of the route cost include the degree of lane centering, an acceleration of the vehicle, a steering angle, and possibility of collision. In a case where the candidate route generator 112 selects a plurality of travel routes, the route determiner 115 selects one travel route.

<Vehicle Behavior Estimator>

The vehicle behavior estimator 113 measures a state of the vehicle from outputs of sensors for detecting a behavior of the vehicle, such as a vehicle speed sensor, an acceleration sensor, and a yaw rate sensor. The vehicle behavior estimator 113 generates a vehicle 6-axis model showing a behavior of the vehicle.

The vehicle 6-axis model here is a model of accelerations in 3-axis directions of "front and rear," "left and right," and "upward and downward" of the traveling vehicle and angular velocities in 3-axis directions of "pitch," "roll," and "yaw." That is, the vehicle 6-axis model is a numerical model obtained by capturing a motion of the vehicle not only in a plane in terms of a classical vehicle motion engineering, and but also by reproducing a behavior of the vehicle by using a total of six axes of pitching (Y axis), roll (X axis) motion, and movement along a Z axis (upward and downward motion of the vehicle body) of the vehicle body on which an occupant is seated on four wheels with suspensions interposed therebetween.

The vehicle behavior estimator 113 applies the vehicle 6-axis model to the travel route generated by the candidate route generator 112, and estimates a behavior of the vehicle 1 in following the travel route.

<Occupant Behavior Estimator>

The occupant behavior estimator 114 estimates especially physical conditions and feelings of a driver, from a detection result of the occupant state sensor SW7. Examples of the physical conditions include good health, mild fatigue, ill health, and loss of consciousness. Examples of the feelings include pleasant, normal, bored, frustrated, and unpleasant.

For example, the occupant behavior estimator 114 extracts a face image of a driver from images captured by, for example, a camera placed in a cabin, and specifies the driver. The extracted face image and information on the specified driver are applied to a human model as inputs. The human model is a learned model generated by deep learning, for example, and physical conditions and feelings are output for each person that can be a driver of the vehicle 1. The occupant behavior estimator 114 outputs the physical conditions and the feelings of the driver output from the human model.

In a case where biometric sensors such as a skin temperature sensor, a heart rate sensor, a blood flow sensor, and a sweat sensor, are used for the occupant state sensor SW7 for acquiring information on a driver, the occupant behavior estimator measures biometric of the driver from outputs of the biometric sensors. In this case, the human model receives biometrics of each person who can be a driver of the vehicle 1, and outputs physical conditions and feelings of the person. The occupant behavior estimator 114 outputs the physical conditions and the feelings of a driver output from the human model.

As the human model, a model that estimates feelings of a human to a behavior of the vehicle 1 may be used with respect to a person who can be a driver of the vehicle 1. In this case, an output of the vehicle behavior estimator 113, biometrics of the driver, and estimated feelings are managed chronologically to constitute a model. This model enables, for example, a relationship between a heightened emotion (consciousness) of a driver and a behavior of the vehicle to be predicted.

The occupant behavior estimator 114 may include a human body model as a human model. The human body model specifies, for example, a neck muscle strength supporting a head mass (e.g., 5 kg) and front, rear, left, and right G. When receiving a motion (acceleration G and jerk) of the vehicle body, the human body model outputs predicted physical feelings and subjective feelings of an occupant. Examples of the physical feelings of the occupant include comfortable/moderate/uncomfortable, and examples of subjective feelings include unpredicted/predictable. Since a vehicle body behavior in which the head of the occupant is bent over backward even slightly, for example, is uncomfortable to the occupant, a travel route causing such a behavior is not selected by referring to the human body model. On the other hand, a vehicle body behavior with which the head moves forward as if the occupant makes a bow allows the occupant to take a posture against this vehicle body behavior easily, and thus, does not make the occupant feel uncomfortable immediately. Thus, a travel route causing such a behavior can be selected. Alternatively, a target motion may be determined to avoid shaking of the head of the occupant or may be dynamically determined to make the head active, by referring to the human body model The occupant behavior estimator 114 applies the human model to a vehicle behavior estimated by the vehicle behavior estimator 113, and estimates a change of physical conditions and a change of feelings of the current driver with respect to the vehicle behavior.

<Route Determiner>

The route determiner 115 determines a route on which the vehicle 1 is to travel, based on an output of the occupant behavior estimator 114. In a case where the candidate route generator 112 generates one generated route, the route determiner 115 sets this route as a route on which the vehicle 1 is to travel. In a case where the candidate route generator 112 generates a plurality of generated routes, in consideration of an output of the occupant behavior estimator 114, the route determiner 115 selects a route on which an occupant (especially a driver) feels comfortable most, that is, a route on which a driver does not feel redundancy such as excessive caution in avoiding an obstacle, among a plurality of candidate routes.

<Rule-Based Route Generator>

The rule-based route generator 120 identifies an object outside the vehicle according to a predetermined rule and generates a travel route avoiding the object, based on outputs from the cameras 70 and the radars 71, without using deep learning. In a manner similar to the candidate route generator 112, the rule-based route generator 120 calculates a plurality of candidate routes by a state lattice method, and based on a route cost of each of the candidate routes, selects one or more candidate routes. The rule-based route generator 120 calculates a route cost based on, for example, a rule in which the vehicle does not enter within a few or several meters around the object. The rule-based route generator 120 may also calculate a route by other methods.

Information of routes generated by the rule-based route generator 120 is input to the vehicle motion determiner 116.

<Backup>

The backup 130 generates a route for guiding the vehicle 1 to a safe area such as a road shoulder based on outputs from the cameras 70 and the radars 71, in a case where a sensor, for example, is out of order or an occupant is not in good physical condition. For example, the backup 130 sets a safe region in which the vehicle 1 can be brought to an emergency stop from information of the position sensor SW5, and generates a travel route to the safe area. In a manner similar to the candidate route generator 112, the backup 130 calculates a plurality of candidate routes by a state lattice method, and based on a route cost of each of the candidate routes, selects one or more candidate routes. This backup 130 may also calculate a route by other methods.

Information on the routes generated by the backup 130 is input to the vehicle motion determiner 116.

<Vehicle Motion Determiner>

The vehicle motion determiner 116 sets a target motion for a travel route determined by the route determiner 115. The target motion refers to steering and acceleration and speed-reduction that allow the vehicle to follow the travel route. The target motion determiner 115 computes a motion of the vehicle body by referring to the vehicle 6-axis model, with respect to the travel route selected by the route determiner 115.

The vehicle motion determiner 116 determines a target motion that allows the vehicle to follow the travel route generated by the rule-based route generator 120.

The vehicle motion determiner 116 determines a target motion that allows the vehicle to follow the travel route generated by the backup 130.

If the travel route determined by the route determiner 115 greatly significantly deviates from the travel route generated by the rule-based route generator 120, the vehicle motion determiner 116 selects the travel route generated by the rule-based route generator 120 as a route on which the vehicle 1 is to travel.

If sensors (especially the cameras 70 or the radars 71), for example, are out of order or a poor physical condition of an occupant is estimated, the vehicle motion determiner 116 selects the travel route generated by the backup 130 as a route on which the vehicle 1 is to travel.

<Physical Quantity Calculator>

The physical quantity calculator is constituted by the driving force calculator 117, the braking force calculator 118, and the steering variable calculator 119. To achieve a target motion, the driving force calculator 117 calculates a target driving force to be generated by the power train devices (the engine 10 and the transmission 20). To achieve the target motion, the braking force calculator 118 calculates a target braking force to be generated by the braking device 30. To achieve the target motion, the steering variable calculator 119 calculates a target steering variable to be generated by the steering device 40.

<Peripheral Equipment Operation Setter>

The peripheral equipment operation setter 140 sets operations of devices related to the body of the vehicle 1, such as a lamp and doors, based on an output of the vehicle motion determiner 116. For example, the peripheral equipment operation setter 140 sets a direction of the lamp when the vehicle 1 follows the travel route determined by the route determiner 115, for example. In the case of guiding the vehicle 1 to a safe area set by the backup 130, for example, the peripheral equipment operation setter 140 turns hazard flashers on or unlocks the doors, after the vehicle 1 has reached the safe area.

<Output Destination of Computation Device>

A computation result in the computation device 110 is output to the power train ECU 200, the brake microcomputer 300, the EPAS microcomputer 500, and a body-related microcomputer 600. Specifically, the power train ECU 200 receives information on a target driving force calculated by the driving force calculator 117, the brake microcomputer 300 receives information on a target braking force calculated by the braking force calculator 118, the EPAS microcomputer 500 receives information on a target steering variable calculated by the steering variable calculator 119, and the body-related microcomputer 600 receives information on operations of devices related to the body and set by the peripheral equipment operation setter 140.

As described above, the power train ECU 200 basically calculates a fuel injection timing of the injector 12 and an ignition timing of the ignition plug 13 such that a target driving force is achieved, and outputs control signals to these traveling devices. The brake microcomputer 300 basically calculates a controlled variable of the brake actuator 33 such that a target driving force is achieved, and outputs a control signal to the brake actuator 33. The EPAS microcomputer 500 basically calculates the amount of current to be supplied to the EPAS device 42 such that a target steering variable is achieved, and outputs a control signal to the EPAS device 42.

As described above, in this embodiment, the computation device 110 only calculates target physical quantities to be output from the traveling devices, and controlled variables of the traveling devices are calculated by the device controllers 200 to 500. Accordingly, the amount of calculation of the computation device 110 decreases so that the calculation speed of the computation device 110 can be increased. The device controllers 200 to 500 only need to calculate actual controlled variables and output control signals to the traveling devices (e.g., the injector 12), and thus, processing speeds thereof are high. Consequently, responsiveness of the traveling device to vehicle outdoor environments can be increased.

Since the device controllers 200 to 500 calculate the controlled variables, the computation device 110 only needs to calculate rough physical quantities. Thus, computation speeds may be lower than those of the device controllers 200 to 500. As a result, computation accuracy of the computation device 110 can be enhanced.

As illustrated in FIG. 4, in this embodiment, the power train ECU 200, the brake microcomputer 300, the DSC microcomputer 400, and the EPAS microcomputer 500 are configured to be communicable with one another. The power train ECU 200, the brake microcomputer 300, the DSC microcomputer 400, and the EPAS microcomputer 500 are configured to share information on controlled variables of the traveling devices and to be capable of executing control for using the information in cooperation with one another.

For example, in a state where a road is slippery, for example, it is required to reduce the rotation speed of the wheels (i.e., so-called traction control) so as not to rotate the wheels idly. To reduce idle rotation of the wheels, an output of the power train is reduced or a braking force of the braking device 30 is used. Since the power train ECU 200 and the brake microcomputer 300 are communicable with each other, an optimum measure using both the power train and the braking device 30 can be taken.

In cornering of the vehicle 1, for example, the controlled variables of the power train and the braking device 30 (including the DSC device 36) are finely adjusted in accordance with a target steering variable so that rolling and pitching in which a front portion of the vehicle 1 sinks are caused to occur in synchronization to cause a diagonal roll position. By causing the diagonal roll position, loads on the outer front wheels 50 increase so that the vehicle 1 is allowed to turn with a small steering angle. Thus, it is possible to reduce a rolling resistance on the vehicle 1.

As another example, in vehicle stability control (dynamic vehicle stability), based on a current steering angle and a current vehicle speed, if a difference occurs between a target yaw rate and a target lateral acceleration calculated as ideal turning state of the vehicle 1 and a current yaw rate and a current lateral acceleration, the braking devices 30 for the four wheels are individually actuated or an output of the power train is increased or reduced so as to cause the current yaw rate and the current lateral acceleration to return to the target values. In techniques employed to date, the DSC microcomputer 400 has to comply with a communication protocol, information on instability of the vehicle is acquired from yaw rate sensors and wheel speed sensors through a relatively low-speed CAN, and actuation is instructed to the power train ECU 200 and the brake microcomputer 300 also through the CAN. These techniques take time, disadvantageously. In this embodiment, information on controlled variables can be directly transmitted among these microcomputers. Thus, brake actuation of the wheels and start of output increase/decrease, which are stability control, can be performed significantly early from detection of a vehicle instability state. Reduction of stability control in a case where a driver performs counter steering can also be conducted in real time with reference to a steering angle speed and other information of the EPAS microcomputer 500.

As yet another example, a front wheel driving vehicle with high power can employ steering angle-linked output control that reduces an output of the power train to avoid an instable state of the vehicle when an accelerator is pressed with a large steering angle. In this control, the power train ECU 200 refers to a steering angle and a steering angle signal of the EPAS microcomputer 500, and reduces an output immediately. Thus, a driving field preferable for a driver without a sense of sudden intervention can be achieved.

<Control at Occurrence of Abnormality>

Here, during traveling of the vehicle 1, abnormalities concerning traveling of the vehicle 1, such as knocking in the engine 10 or slipping of the front wheels 50, occur in some cases. At occurrence of such abnormalities, traveling devices need to be controlled quickly in order to eliminate or reduce these abnormalities. As described above, the computation device 110 identifies vehicle outdoor environment using deep learning, and performs a huge amount of computation in order to calculate routes of the vehicle 1. Thus, when computation for eliminating or reducing the abnormalities is performed through the computation device 110, measures might be taken with a delay.

In view of this, in this embodiment, when an abnormality concerning traveling of the vehicle 1 is detected, the device controllers 200 to 500 calculate the controlled variables of the traveling devices in order to eliminate or reduce the abnormality and cause the traveling devices to output control signals, without using the computation device 110.

Figure 5:
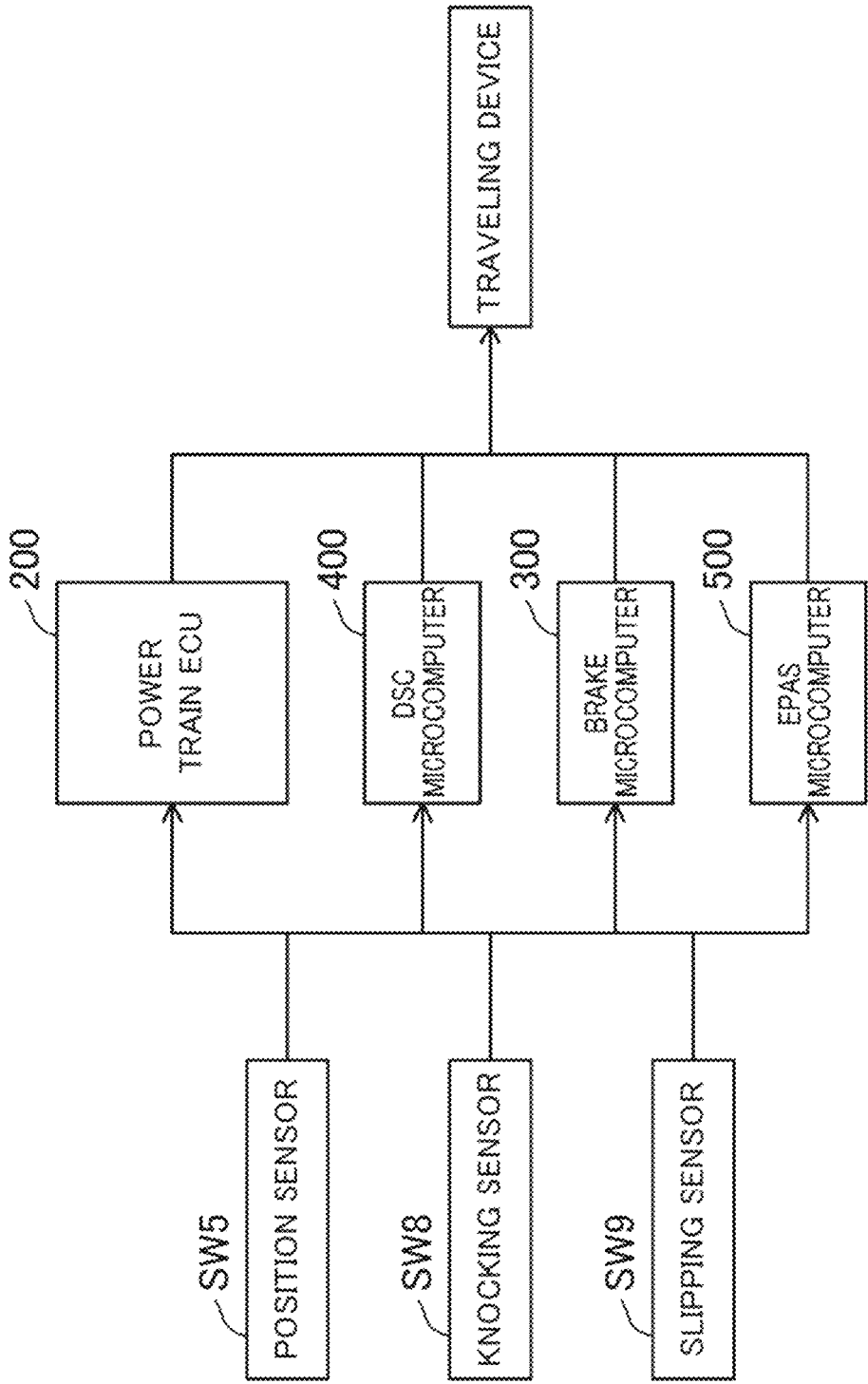
FIG. 5 A block diagram showing a relationship between an abnormality detector and a device controller.

FIG. 5 shows, as an example, a relationship between sensors SW5, SW8, and SW9 for detecting abnormalities in traveling of the vehicle 1 and the device controllers 200, 300, and 500. In FIG. 5, sensors for detecting abnormalities in traveling of the vehicle 1 are the position sensor SW5, a knocking sensor SW8, and a slipping sensor SW9, but other sensors may be provided. The knocking sensor SW8 and the slipping sensor SW9 may be known sensors. The position sensor SW5, the knocking sensor SW8, and the slipping sensor SW9 correspond to abnormality detectors, and the sensors themselves detect an abnormality in traveling of the vehicle 1.

For example, when the knocking sensor SW8 detects knocking, a detection signal is input to each of the device controllers 200 to 500 (especially the power train ECU 200). After the detection signal has been input, the power train ECU 200 reduces knocking by adjusting a fuel injection timing of the injector 12 and an ignition timing of the ignition plug 13. At this time, the power train ECU 200 calculates controlled variables of the traveling device while allowing a shift of a driving force output from the power train from a target driving force.

Figure 6:
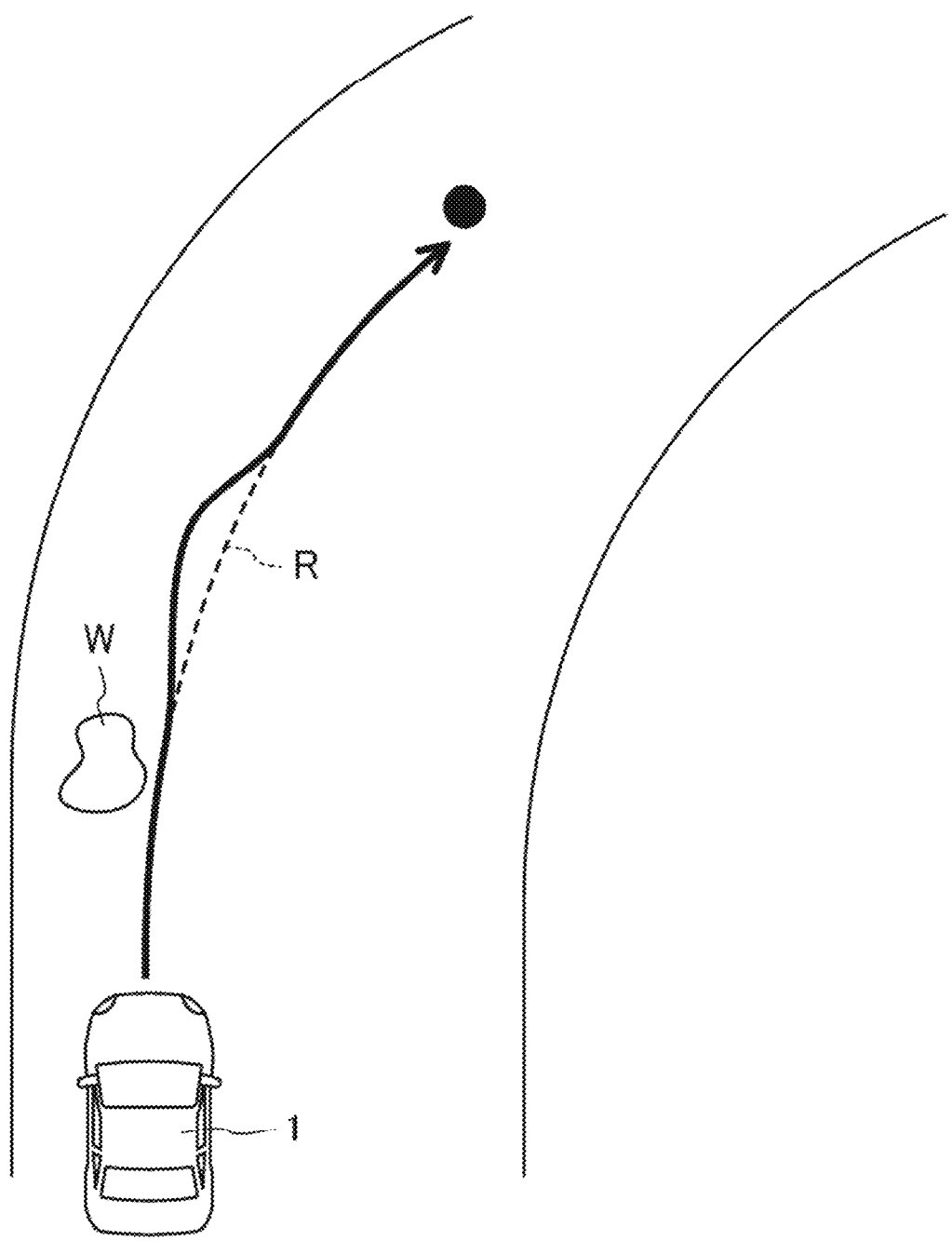
FIG. 6 An illustration of an example of a travel route of a vehicle.

FIG. 6 illustrates an example of a behavior of the vehicle 1 when slipping occurs. In FIG. 6, the solid line is an actual travel route of the vehicle 1, and a dotted line is a travel route set by the computation device 110 (hereinafter referred to as a theoretical travel route R). In FIG. 6, the solid line and the dotted line partially overlap each other. In FIG. 6, a black circle indicates a goal of the vehicle 1.

As illustrated in FIG. 6, supposing a puddle W is present in the middle of the travel route of the vehicle 1 and the front wheels of the vehicle 1 go into the puddle W to cause slipping. At this time, as illustrated in FIG. 6, the vehicle 1 temporarily deviates from the theoretical travel route R. Slipping of the front wheels of the vehicle 1 is detected by the slipping sensor SW9 (see FIG. 5), and deviation from the theoretical travel route R is detected by the position sensor SW5 (see FIG. 5). These detection signals are input to the device controllers 200 to 500. Thereafter, for example, the brake microcomputer 300 actuates the brake actuator 33 so as to increase a braking force of the front wheels. The EPAS microcomputer 500 actuates the EPAS device 42 so as to cause the vehicle 1 to return to the theoretical travel route R. At this time, communication between the brake microcomputer 300 and the EPAS microcomputer 500 can optimize a controlled variable of the EPAS device 42 in consideration of a braking force by the braking device 30. In the manner described above, as illustrated in FIG. 6, the vehicle 1 can return to the theoretical travel route R smoothly and quickly so that traveling of the vehicle 1 can be stabilized.

As described above, when an abnormality in traveling of the vehicle 1 is detected, the device controllers 200 to 500 calculate controlled variables of the traveling device in order to eliminate or reduce the abnormality without using the computation device 110, and output control signals to the traveling devices. Accordingly, responsiveness of the traveling devices to vehicle outdoor environments can be enhanced.

Therefore, in this embodiment, the vehicle travel control device includes: the computation device 110; and the device controllers 200 to 500 configured to control actuation of the traveling devices (e.g., the injector 12) mounted on the vehicle 1 based on a computation result of the computation device 110. The computation device 110 includes: the vehicle outdoor environment identifier 111 configured to identify a vehicle outdoor environment based on outputs from the cameras 70 and the radars 71 configured to acquire information on the vehicle outdoor environment; the route setter (e.g., the route calculator 112) configured to set a route on which the vehicle 1 is to travel in accordance with the vehicle outdoor environment identified by the vehicle outdoor environment identifier 111; the vehicle motion determiner 116 configured to determine a target motion of the vehicle 1 in order to follow the route set by the route setter; and the physical quantity calculators 117 to 119 configured to calculate target physical quantities in order to achieve the target motion determined by the vehicle motion determiner 116. The device controllers 200 to 500 calculate controlled variables of the traveling devices such that the target physical quantities calculated by the physical quantity calculators 117 to 119 is achieved, and outputs control signals to the traveling devices. In this manner, the computation device 110 only calculates physical quantities to be achieved, and actual controlled variables of the traveling devices are calculated by the device controllers 200 to 500. Accordingly, the amount of calculation of the computation device 110 decreases so that the calculation speed of the computation device 110 can be increased. The device controllers 200 to 500 only need to calculate actual controlled variables and output control signals to the traveling devices, and thus, processing speeds thereof are high. Consequently, responsiveness of the traveling devices to the vehicle outdoor environment can be increased.

In particular, in this embodiment, the vehicle outdoor environment identifier 111 identifies a vehicle outdoor environment by using deep learning, and thus, especially the computation device 110 performs a large amount of calculation. Thus, the controlled variables of the traveling devices are calculated by the device controllers 200 to 500 other than the computation device 110 so that the advantage of further enhancing responsiveness of the traveling devices to the vehicle outdoor environment can be more appropriately obtained.

<Other Control>

During assisted driving of the vehicle 1, the driving force calculator 117, the braking force calculator 118, and the steering variable calculator 119 may change a target driving force, for example, in accordance with the state of a driver of the vehicle 1. For example, while the driver enjoys driving (e.g., feeling of the driver is "enjoy"), the target driving force, for example, may be reduced so that the driving state approaches manual driving as close as possible. On the other hand, if the driver is in a poor physical condition, the target driving force, for example, is increased so that the driving state approaches automated driving as close as possible.

Other Embodiments

The technique disclosed here is not limited to the embodiment described above, and can be changed without departing from the gist of claims.

For example, in the embodiment described above, the route determiner 115 determines a route on which the vehicle 1 is to travel. However, the technique is not limited to this example, and the route determiner 115 may be omitted, and the vehicle motion determiner 116 may determine a route on which the vehicle 1 is to travel. That is, the vehicle motion determiner 116 may serve as both a part of the route setter and the target motion determiner.

In the embodiment described above, the driving force calculator 117, the braking force calculator 118, and the steering variable calculator 119 calculate target physical quantities such as a target driving force. However, the technique is not limited to this example, and the driving force calculator 117, the braking force calculator 118, and the steering variable calculator 119 may be omitted, and the vehicle motion determiner 116 may calculate a target physical quantity. That is, the vehicle motion determiner 116 may serve as both the target motion determiner and the physical quantity calculator.

The embodiment described above is merely an example, and the scope of the present disclosure should not be construed as limiting. The scope of the present disclosure is defined by the claims, and all changes and modifications that come within the meaning and range of equivalency of the claims are intended to be embraced within the scope of the present disclosure.

INDUSTRIAL APPLICABILITY

The technique disclosed here is useful as a vehicle travel control device for controlling traveling of a vehicle.

DESCRIPTION OF REFERENCE CHARACTERS 1 vehicle
12 injector (traveling device, power train-related device)
13 ignition plug (traveling device, power train-related device)
16 valve mechanism (traveling device, power train-related device)
20 transmission (traveling device, power train-related device)
33 brake actuator (traveling device, brake-related device)
42 EPAS device (traveling device, steering-related device)
100 vehicle travel control device
110 computation device
111 vehicle outdoor environment identifier
112 route calculator (route setter)
113 vehicle behavior estimator (route setter)
114 occupant behavior estimator (route setter)
115 route determiner (route setter)
116 vehicle motion determiner (target motion determiner)
117 driving force calculator (physical quantity calculator)
118 braking force calculator (physical quantity calculator)
119 steering variable calculator (physical quantity calculator)
200 power train ECU (device controller)
300 brake microcomputer (device controller)
400 DSC microcomputer (device controller)
500 EPAS microcomputer (device controller)
SW5 position sensor (abnormality detector)
SW6 knocking sensor (abnormality detector)
SW7 slipping sensor (abnormality detector)

The invention claimed is:
1. A vehicle travel control device comprising:
computation circuitry; and a device controller separate from the computation circuitry and configured to control actuation of a traveling device mounted on a vehicle, based on a computation result of the computation circuitry, wherein the computation circuitry is configured to identify a vehicle outdoor environment based on an output from image circuitry, the image circuitry being configured to acquire image information of the vehicle outdoor environment, generate one or more candidate routes on which the vehicle is capable of traveling, in accordance with the vehicle outdoor environment previously identified, determine a route on which the vehicle is to travel from the one or more candidate routes generated, determine a future target motion of the vehicle to follow the route previously determined, calculate a target physical quantity to be executed by the traveling device to achieve the target motion previously determined, detect an abnormality that occurs in the vehicle during traveling, and calculate a controlled variable of the traveling device such that the target physical quantity calculated is achieved, and the device controller outputs a control signal to the traveling device so as to control the traveling device to control a motion of the vehicle, and the device controller is further configured to, under a condition the abnormality is detected, calculate a controlled variable of the traveling device in order to eliminate or reduce the abnormality, and output a control signal to the traveling device so as to control an operation of the traveling device, without using the computation circuitry.

2. The vehicle travel control device according to claim 1, wherein the traveling device comprises a power train-related device constituting a power train device, a brake-related device constituting a braking device, and a steering-related device constituting a steering device, the device controller comprises a power train controller configured to control actuation of the power train-related device, a brake controller configured to control actuation of the brake-related device, and a steering controller configured to control actuation of the steering-related device, and the power train controller, the brake controller, and the steering controller are configured to share information with one another, including information on physical quantities generated by the power train controller, the brake controller, and the steering controller.

3. The vehicle travel control device according to claim 2, wherein the computation circuitry is configured to include a learned model and apply the learned model to identify the vehicle outdoor environment while the vehicle is in motion.

4. The vehicle travel control device according to claim 3, wherein the learned model is a convolutional neural network (CNN).

5. The vehicle travel control device according to claim 2, wherein the computation circuitry is configured to include a learned model and apply the learned model to identify an occupant behavior of an occupant while the vehicle is in motion.

6. The vehicle travel control device according to claim 1, wherein the traveling device comprises a power train-related device constituting a power train device, a brake-related device constituting a braking device, and a steering-related device constituting a steering device, and the device controller comprises a power train controller configured to control actuation of the power train-related device, a brake controller configured to control actuation of the brake-related device, and a steering controller configured to control actuation of the steering-related device.

7. The vehicle travel control device according to claim 6, wherein the computation circuitry is configured to include a learned model and apply the learned model to identify the vehicle outdoor environment while the vehicle is in motion.

8. The vehicle travel control device according to claim 7, wherein the learned model is a convolutional neural network (CNN).

9. The vehicle travel control device according to claim 1, wherein the computation circuitry is configured to include a learned model and apply the learned model to identify the vehicle outdoor environment while the vehicle is in motion.

10. The vehicle travel control device according to claim 9, wherein the learned model is a convolutional neural network (CNN).

11. The vehicle travel control device according to claim 1, wherein the computation circuitry is configured to include a learned model.

12. The vehicle travel control device according to claim 11, wherein the learned model is a convolutional neural network (CNN).

13. The vehicle travel control device according to claim 1, wherein the computation circuitry is configured to include a learned model and apply the learned model to identify a travel route of the vehicle while the vehicle is in motion.

14. The vehicle travel control device according to claim 1, wherein the computation circuitry is configured to include a learned model and apply the learned model to identify a behavior of the vehicle while the vehicle is in motion.

15. The vehicle travel control device according to claim 1, further comprising the image circuitry, the image circuitry including a camera.

16. The vehicle travel control device according to claim 1, further comprising:

a radar that provides an input to the computation circuitry, and the computation circuitry is configured to determine the vehicle outdoor travel environment using the respective outputs of the image circuitry and the radar.

17. A vehicle travel control method comprising:

controlling, with a device controller separate from computation circuitry, actuation of a traveling device mounted on a vehicle, based on a computation result provided by the computation circuitry, wherein the computation circuitry performing identifying a vehicle outdoor environment based on an output from image circuitry;

generating one or more candidate routes on which the vehicle is capable of traveling, in accordance with the vehicle outdoor environment previously identified, determining a route on which the vehicle is to travel from the one or more candidate routes generated, determining a future target motion of the vehicle to follow the route previously determined, calculating a target physical quantity to be executed by the traveling device to achieve the target motion previously determined, detecting an abnormality that occurs in the vehicle during traveling, and calculating a controlled variable of the traveling device such that the target physical quantity calculated is achieved, and controlling a motion of the vehicle by applying a control signal that contains the controlled variable to the traveling device, and calculating, under a condition the abnormality is detected, a controlled variable of the traveling device in order to eliminate or reduce the abnormality, and outputting a control signal to the traveling device so as to control an operation of the traveling device, without using the computation circuitry.

18. The vehicle travel control method of claim 17, further comprising:

applying a learned model to identify a vehicle outdoor environment while the vehicle is in motion.

19. A non-transitory computer readable medium having instructions stored therein that once executed by a processor cause the processor to execute a vehicle travel control method, the method comprising:

controlling, with a device controller separate from computation circuitry, actuation of a traveling device mounted on a vehicle, based on a computation result provided by the computation circuitry, wherein the computation circuitry performing identifying a vehicle outdoor environment based on an output from image circuitry;

generating one or more candidate routes on which the vehicle is capable of traveling, in accordance with the vehicle outdoor environment previously identified, determining a route on which the vehicle is to travel from the one or more candidate routes generated, determining a future target motion of the vehicle to follow the route previously determined, calculating a target physical quantity to be executed by the traveling device to achieve the target motion previously determined, detecting an abnormality that occurs in the vehicle during traveling, and calculating a controlled variable of the traveling device such that the target physical quantity calculated is achieved, and controlling a motion of the vehicle by applying a control signal that contains the controlled variable to the traveling device, and calculating, under a condition the abnormality is detected, a controlled variable of the traveling device in order to eliminate or reduce the abnormality, and outputting a control signal to the traveling device so as to control an operation of the traveling device, without using the computation circuitry.

\* \* \* \* \*